(12) United States Patent
Higgins

(10) Patent No.: US 6,452,127 B1
(45) Date of Patent: Sep. 17, 2002

(54) MULTI-ELECTRODE EDM MACHINE

(75) Inventor: David Matthew Higgins, Dextor, MI (US)

(73) Assignee: Raycon Corporation, Ann Arbor, MI (US)

( * ) Notice: Subject to any disclaimer, the term of this patent is extended or adjusted under 35 U.S.C. 154(b) by 0 days.

(21) Appl. No.: 09/503,059

(22) Filed: Feb. 12, 2000

Related U.S. Application Data
(60) Provisional application No. 60/119,859, filed on Feb. 12, 1999.

(51) Int. Cl.[7] .................................................. B23H 7/30
(52) U.S. Cl. ...................................... 219/69.2; 219/69.17
(58) Field of Search ........................... 219/69.11, 69.15, 219/69.2, 68, 69.17; 204/224 M

(56) References Cited

U.S. PATENT DOCUMENTS

| | | | |
|---|---|---|---|
| 3,614,371 A | * 10/1971 | Simpkins et al. | 219/69.2 |
| 4,041,269 A | * 8/1977 | Baker | 219/69.15 |
| 4,044,216 A | * 8/1977 | Check et al. | 219/69.15 |
| 4,121,081 A | * 10/1978 | Baker | 219/69.15 |
| 4,441,004 A | * 4/1984 | Inoue | 219/69.15 |
| 4,814,573 A | * 3/1989 | Check et al. | 219/69.15 |

* cited by examiner

*Primary Examiner*—Geoffrey S. Evans
(74) *Attorney, Agent, or Firm*—Reising, Ethington, Barnes, Kisselle, Learman & McCulloch, P.C.

(57) ABSTRACT

An EDM machine with a plurality of separate electrodes selectively driven by the same actuator on the same head of the EDM machine is provided. Preferably, all of the electrodes are not used to cut the workpiece at the same time. Rather, the actuator has a drive mechanism, which is preferably servo-controlled, and each electrode is selectively engaged with the drive mechanism to advance and retract only the desired electrode relative to the workpiece. Either the workpiece or the EDM head is preferably manipulated using a CNC positioning system to accurately locate the desired electrode relative to the workpiece.

11 Claims, 1 Drawing Sheet

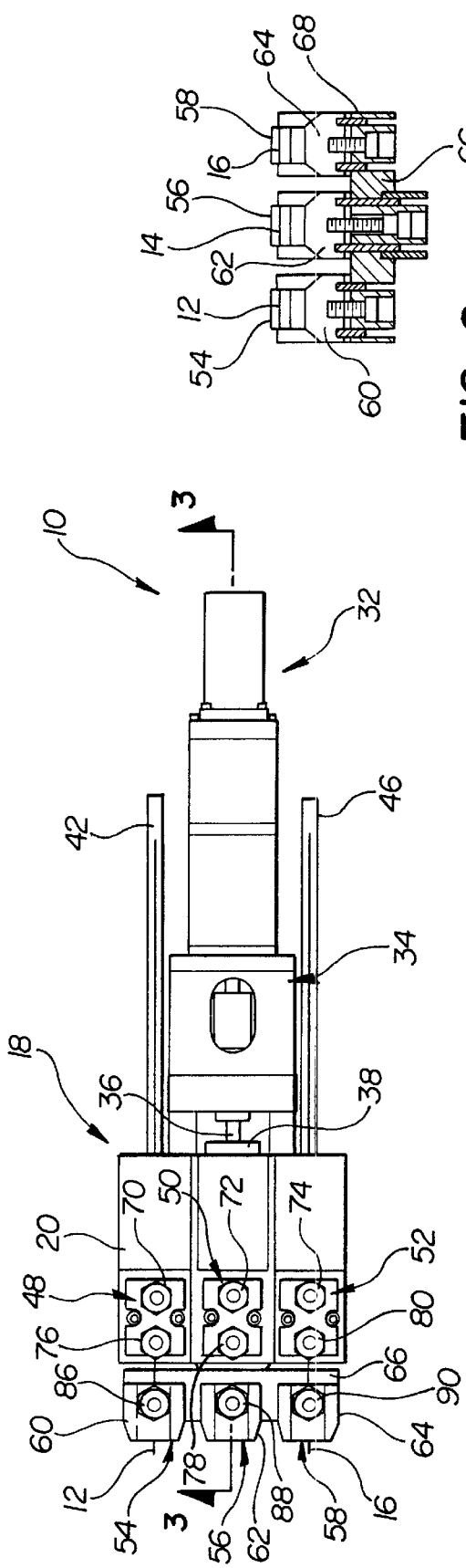
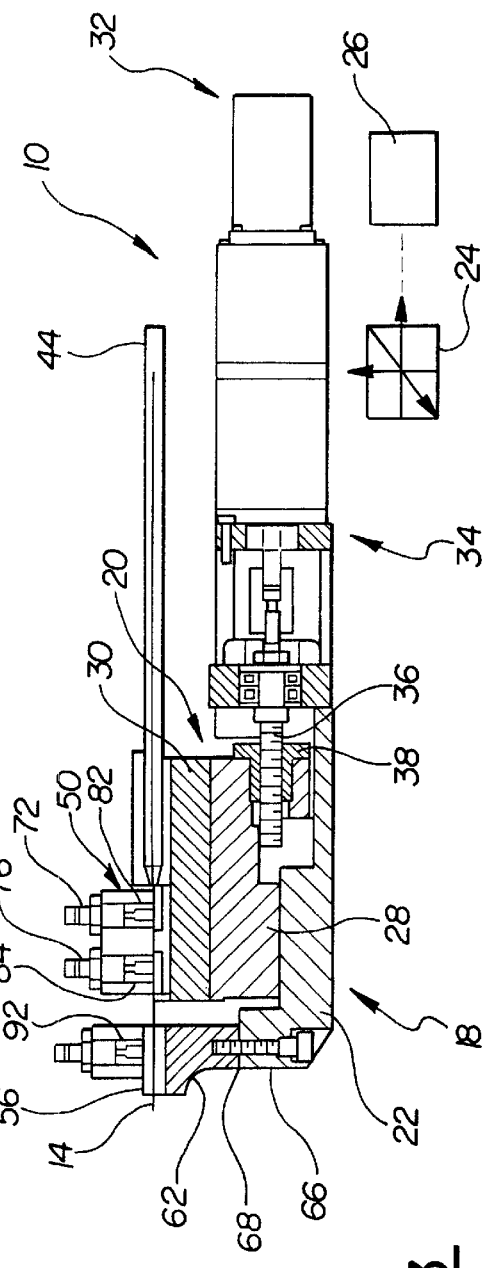
FIG-1
FIG-2
FIG-3

MULTI-ELECTRODE EDM MACHINE

CO-PENDING APPLICATION

This application claims the benefit of U.S. application Ser. No. 60/119,859 filed on Feb. 12, 1999.

FIELD OF THE INVENTION

This invention relates generally to electrical discharge machining and more particularly, to an electrical discharge machine having more than one electrode.

BACKGROUND OF THE INVENTION

Conventional machines for electrical discharge machining (EDM) have a single electrode carried by a holder, movable relative to a metallic workpiece by a servo-controlled actuator and energized by a pulsed electrical current to form holes, slots or cavities in the metallic workpiece. An operative end of the electrode is spaced from the workpiece providing a spark gap therebetween which permits a spark discharge to pass between the electrode and the workpiece. Each spark produces heat sufficient to melt or vaporize the adjacent portion of the workpiece leaving a pit or cavity in the workpiece. EDM is ideal for applications involving workpieces that are difficult to machine, have a complex shape, require small slots, holes or passages and close tolerances.

The single electrode of a conventional EDM machine enables only one hole size to be formed into a single workpiece. To form different sized holes in a workpiece, the machine must be taken out of production for a tooling change which greatly increases the down time of the system and significantly increases the time and cost to manufacture a workpiece. Still further, the operator of the machine may not be able to change the tooling requiring another individual to perform this operation which extends the down time and further increases the cost to manufacture the workpiece. Alternatively, the workpiece may be carried on a fixture to multiple workstations, each having a separate EDM machine, to form different sized holes in the workpiece. This significantly increases the complexity and cost to manufacture a workpiece because multiple EDM machines are needed, and the fixture and transport mechanisms must be extremely accurate and reliable to form consistent workpieces. Introducing multiple EDM machines, fixtures and a transport system significantly reduces the reliability of the system as a whole thereby increasing the system down time and increasing the cost of manufacture.

SUMMARY OF THE INVENTION

An EDM machine with a plurality of separate electrodes on the same head of the EDM machine and selectively driven by the same actuator, is provided. Preferably, all of the electrodes are not used to cut the workpiece at the same time. Rather, the actuator has a drive mechanism, which is preferably servo-controlled, and each electrode is selectively engaged with the drive mechanism to advance and retract only the desired electrode relative to the workpiece. Either the workpiece or the EDM head may be manipulated using a CNC positioning system to accurately locate the desired electrode relative to the workpiece.

The EDM machine preferably has a carriage driven between retracted and advanced positions relative to a base by the drive mechanism. Each electrode is selectively coupled to the carriage for co-movement therewith between corresponding retracted and advanced positions, by a separate drive clamp. To advance or retract one of the electrodes, the drive clamp is closed and the carriage is moved relative to the base to move the electrode with the carriage. When the drive clamp of an electrode is open, the electrode is not coupled to the carriage so that the carriage may be moved relative to the electrode which remains in its retracted position when it is not needed.

To account for wear of the electrodes and to reset their position relative to the carriage, a re-feed clamp carried by the base may be provided for each electrode. As the electrode wears away, it can be replenished or reset by advancing the remaining electrode relative to the carriage. To do this, on the retract stroke of the carriage the re-feed clamp of the electrode is closed to clamp the electrode and the drive clamp of that electrode is opened, releasing the electrode from the carriage. Continued movement of the carriage to its retracted position and relative to the electrode will, in effect, advance the electrode relative to the carriage to reset the position of the operative end of the electrode relative to or pull the electrode further out of the carriage. Each re-feed clamp may also be used to maintain its corresponding electrode in its retracted position when the carriage is advanced and the electrode is not needed.

According to one aspect of the invention, each electrode may be of a different size or shape to permit differently sized holes, slots or cavities and the like to be formed in a workpiece at the same workstation in a single fixture. Another object and advantage of the invention is that a wide range of holes, slots or cavities may be formed with a single EDM machine using a single head driven by a single drive actuator, typically servo-controlled, and without having to change tooling or provide multiple EDM heads, multiple drives and controls therefor, or multiple workstations and a system to transport the workpieces between workstations. Yet another advantage of the invention is that multiple workpieces requiring different holes, slots and the like may be machined by a single EDM without any tooling change.

BRIEF DESCRIPTION OF THE DRAWINGS

These and other objects, features and advantages of this invention will be apparent from the following detailed description of the preferred embodiment and best mode, appended claims and accompanying drawings in which:

FIG. 1 is a plan view of an EDM machine embodying the present invention with a center electrode and tube removed to simplify the view;

FIG. 2 is an end view of the EDM machine of FIG. 1 illustrating electrode guides and their mounting to a base; and FIG. 3 is a cross-sectional view taken along line 3—3 of FIG. 1.

DETAILED DESCRIPTION OF THE PREFERRED EMBODIMENT

Referring in more detail to the drawings, FIGS. 1–3 illustrate an EDM machine 10 embodying the present invention and having a plurality of electrodes 12,14,16 carried by a single EDM head 18 and selectively coupled to a carriage 20 slidable relative to a base 22 of the head 18 to dispose an electrode adjacent to a workpiece to be machined. Desirably, each electrode 12,14,16 may have a different size or shape and may be individually advanced toward and used to machine the workpiece to enable the single EDM machine 10 and head 18 to cut a variety of shapes and sizes of holes, slots, cavities and the like into the workpiece. Preferably, to facilitate aligning a desired one of the electrodes 12,14,16 with the workpiece, either the head 18 or the workpiece is carried and manipulated by a CNC positioning system 24 operated by a controller 26.

The carriage 20 is slidably carried by the base 22, such as by spaced apart, parallel rails (not shown) so that it can move relative to the base between retracted and extended positions. The carriage 20 has a base plate 28, and a mounting plate 30 fixed to the base plate 28.

To move the carriage 20 between its retracted and extended positions, a drive mechanism 32 carried by the base 22 is operatively connected to the carriage 20. More specifically, in the embodiment shown in FIGS. 1–3, the drive mechanism 32 is a servo-controlled reversible motor 34 which is connected to the carriage by a ballscrew 36 driven by the motor 34 and a nut 38 received on the ballscrew 36 and connected to the carriage 20. As the motor 34 rotates the ballscrew 36, the nut travels axially along the ballscrew 38 in a direction corresponding to the direction of rotation to cause linear reciprocation of the carriage 20 relative to the base 22 in a conventional manner. Alternatively, the drive mechanism 32 may be of substantially any other design suitable to cause linear reciprocation of the carriage 20, such as, for example, a pneumatic or hydraulic cylinder, piezoelectric motor, linear motor and so forth.

According to the present invention, a plurality of electrodes 12,14,16 are disposed on the carriage 20 and may be individually used to machine a workpiece as desired. Each electrode 12,14,16 may be of substantially any size or shape and is preferably elongate to account for wear in use and extend their useful life. Each electrode 12,14,16 is carried by a separate tube 42,44,46 carried by the mounting plate 30 which physically and electrically isolates the electrodes from the surrounding components of the machine 10. Each electrode 12,14,16 extends out of its respective tube 42,44, 46, through a corresponding clamp assembly 48,50,52, respectively, fixed to the mounting plate 30 of the carriage 20, and then through a corresponding electrode guide 54,56, 58 which properly orients the operative end of its electrode 12,14,16. Each electrode guide 54,56,58 is fixed to a corresponding guide support 60,62,64 which are in turn fixed to a sub-base 66 fixed to the base 22 of the head 18 all by cap screws. A thermally insulating pad 68 may be disposed between the guide supports 60,62,64 and the sub-base 66 to limit the heat transfer between them. Thus, the electrode guides 54,56,58 are not carried by or movable with the carriage 20.

Each clamp assembly 48,50,52 has a pneumatic drive clamp 76,78,80 and optionally and preferably has an electrode position sensor clamp 70,72,74. The electrode position sensor clamps 70,72,74 each have a plunger 82 (FIG. 3) driven by a pneumatic signal between an open position spaced from its electrode 12,14,16, and a closed position bearing on its electrode 12,14,16. A sensor (not shown) carried by the plunger 82 of each sensor clamp, determines the existence of its electrode under its plunger 82. If no electrode is sensed under the plunger 82, a signal is sent to the controller indicating that the electrode is nearly completely used up and should be replaced by a new electrode.

Each drive clamp 76,78,80 has a plunger 84 (FIG. 3) driven by a pneumatic signal between an open position spaced from its corresponding electrode 12,14,16 and a closed position bearing on its electrode and releasably coupling its electrode with the carriage for co-movement therewith. The plunger 84 of each drive clamp 76,78,80 may be moved independently of the plungers 84 of the other drive clamps to selectively couple the electrodes, as desired, to the carriage.

Optionally, a separate re-feed clamp 86,88,90 may be provided on each electrode guide 54,56,58. Each re-feed clamp 86,88,90 has a plunger 92 driven by a pneumatic signal between an open position spaced from its electrode 12,14 or 16 in its corresponding electrode guide 54,56,58 and a closed position bearing on the electrode. In use, as the electrodes become worn or are "used up" they must be replenished or reset by advancing the remaining electrode relative to the carriage 20 so that a sufficient portion of the electrode extends beyond its guide 54,56,58 and may be disposed adjacent to a workpiece. To accomplish this, the plunger 92 of the associated re-feed clamp 86,88,90 is driven to its closed position during at least a portion of the return stroke of the carriage 20 (when it moves toward its retracted position) and the associated drive clamp 76,78,80 for that electrode is released to permit relative movement between the carriage 20 and the electrode. Continued movement of the carriage 20 to its retracted position, with the electrode trapped against movement by its re-feed clamp, effectively extends the electrode relative to or pulls the electrode out of the carriage 20 a short distance. With the electrode in its desired position, its re-feed clamp is released or opened.

In use, to machine a workpiece, the workpiece is aligned with the electrode 12,14 or 16 having the desired characteristics. This is done under CNC control by moving the head 18 relative to the workpiece, or the workpiece relative to the head 18 if the workpiece is carried by the CNC positioning device 24. To permit the selected electrode 12,14 or 16 to be advanced, a pneumatic signal is provided to its drive clamp 76,78 or 80 causing its plunger 82 to move to its closed position coupling only the selected electrode 12,14 or 16 to the carriage 20. The carriage 20 is then moved from its retracted position toward its advanced position adjacent to the workpiece via the motor 34 through the ballscrew 36 and nut 38. The selected electrode is advanced with the carriage toward the workpiece and the final distance between the selected electrode and workpiece is controlled by the servo-controller of the motor 34. The appropriate electrical current is applied to the selected electrode to machine the workpiece as desired.

When the machining operation is complete, the carriage 20 is moved toward its retracted position by the motor 34. To account for wear of the electrode, prior to the carriage 20 reaching its fully retracted position, the drive clamp plunger 82 associated with the selected electrode is moved to its open position and the corresponding re-feed plunger 92 is moved to its closed position locking the selected electrode to the base 22 through its electrode guide, its guide support, and the sub-base. Further movement of the carriage to its retracted position causes relative movement between the selected electrode and the carriage to increase the length of the selected electrode which extends from the carriage 20.

When the selected electrode and carriage are initially advanced, the drive clamps 76,78,80 of the other or non-selected electrodes are maintained in their open positions permitting relative movement between these electrodes and the carriage. If desired, the re-feed clamps of the non-selected electrodes can be closed to ensure that the electrodes are not advanced with the advancing carriage. Alternatively, the electrode guides may have a spring loaded holder or other mechanism which provides sufficient drag to prevent movement of a non-selected electrode without having to close its re-feed clamp. However constructed, preferably, only one electrode is advanced to the workpiece at a time.

While the invention has been described with reference to a preferred embodiment, it will be readily appreciated by those skilled in the art that modifications can be made without departing from the spirit and scope of the invention as defined by the appended claims. For example, while three electrodes have been shown and described, any number of electrodes (more than one) may be provided.

What is claimed is:

1. An electrical discharge machine, comprising:

a head having a base and a carriage movable relative to the base between retracted and advanced positions;

at least two electrodes separately carried by the head; and at least one drive clamp for each electrode, each drive clamp is carried by the carriage and is movable between an open position and a closed position to selectively couple its associated electrode to the carriage for co-movement with the carriage such that each electrode may be coupled to the carriage independently of any other electrode for movement with the carriage when desired to machine a workpiece.

2. The machine of claim 1 wherein each drive clamp is pneumatically actuated and has a plunger movable in response to a pneumatic signal between an open position spaced from the electrode and a closed position bearing on the electrode to couple the electrode to the carriage.

3. The machine of claim 1 wherein the at least two electrodes are carried by the carriage with each electrode having different properties.

4. The machine of claim 1 which also comprises a plurality of re-feed clamps with a separate re-feed clamp for each electrode, each re-feed clamp being carried by the base and movable between open and closed positions to selectively engage an associated electrode to substantially prevent movement of the electrode when engaged therewith.

5. The machine of claim 4 wherein each said refeed clamp may be actuated independently of the other refeed clamps.

6. The machine of claim 4 wherein each said refeed clamp is actuated by a pneumatic signal to move between its positions.

7. The machine of claim 4 wherein each said re-feed clamp is actuated by an electric signal to move between its positions.

8. The machine of claim 4 wherein:

each said refeed clamp is configured to be driven to its closed position during at least a portion of the return stroke of the carriage; and each associated respective drive clamp is configured to release when the refeed clamp is driven closed permitting relative movement between the carriage and an associated electrode.

9. A method for machining a workpiece using an electrical discharge machine comprising a head having a base and a carriage movable relative to the base between retracted and advanced positions, at least two electrodes separately carried by the head, and at least one drive clamp for each electrode, each drive clamp being carried by the carriage and movable between an open position and a closed position; the method including the steps of:

aligning a workpiece with a selected one of the electrodes, the selected electrode having desirable characteristics for machining the workpiece;

closing the associated drive clamp on the selected electrode;

moving the selected electrode to within a desired distance from the workpiece for machining the workpiece by advancing the carriage carrying the selected electrode toward the workpiece while the other non-selected electrodes remain in their retracted positions; and applying electrical current to the selected electrode to machine the workpiece as desired.

10. The method of claim 9 including the additional steps of:

moving the carriage carrying the selected electrode toward its retracted position;

opening the associated drive clamp and closing the associated re-feed clamp before the carriage reaches its fully retracted position to increase the length of a portion of the selected electrode extending from the carriage.

11. The method of claim 9 including the additional step of closing the re-feed clamps of the non-selected electrodes before the step of moving the selected electrode to within a desired distance from the workpiece to insure that the non-selected electrodes do not advance with the advancing carriage.

* * * * *